Figure 1:
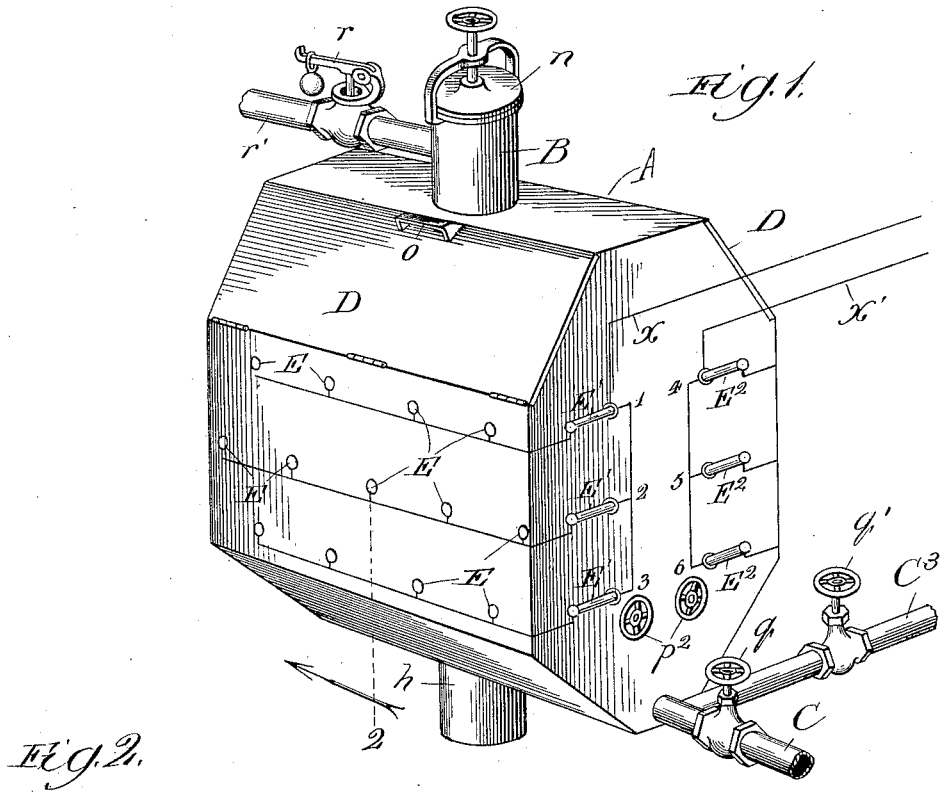

(No Model.)

F. H. SODEN.
PROCESS OF AND APPARATUS FOR ELECTRICALLY TREATING ORES.

No. 590,673. Patented Sept. 28, 1897.

Witnesses:
Chas. E. Gaylord
Lute J. Alter

Inventor:
Francis H. Soden,
By Dyrenforth & Dyrenforth,
Attys

UNITED STATES PATENT OFFICE.

FRANCIS H. SODEN, OF CHICAGO, ILLINOIS.

PROCESS OF AND APPARATUS FOR ELECTRICALLY TREATING ORES.

SPECIFICATION forming part of Letters Patent No. 590,673, dated September 28, 1897.

Application filed July 13, 1894. Serial No. 517,449. (No model.)

*To all whom it may concern:*

Be it known that I, FRANCIS H. SODEN, a citizen of the United States, residing at Chicago, in the county of Cook and State of Illinois, have invented a new and useful Improvement in Processes of and Apparatus for Electrically Treating Ores, of which the following is a specification.

My invention relates to an improved process and an improved apparatus by means of which to practice the process for the treatment of ore with the aid of electricity to the end that the contained metal shall be separated from it in a uniformly pure state.

My improvement is especially designed for, though not necessarily limited to, affording a supplemental or finishing treatment of ore after it has undergone a preparatory purifying treatment to reoxidize it and expel from it the contained salts and acids, convert it (if iron ore) into a metallic and magnetic oxid, and remove the contained sulfur, phosphorus, arsenic, and other metalloids. The now well-known Cherry process of ore purification set forth in Letters Patent of the United States Nos. 290,213 and 290,214, dated December 18, 1883, comes, so far as I am aware, nearest of any to completely removing impurities from ore treated according to it with the results above referred to; but it appears that desirably complete purification of the ore is not attainable even by that process, so that it is peculiarly adapted to be supplemented by my improved electric treatment, which I have more particularly devised, therefore, for such especial application, since the said Cherry process, by serving, as it does, to convert the ore (if iron ore) into a metallic and magnetic condition, renders it most favorable for the application of electricity, owing to its conductive qualities as a medium through which to relieve the ore of the remnant of its impurities, which in iron ore are designated "red oxids" or the metallic base of the metalloids; but I find that in addition to relieving the ore of this remnant my improved electric treatment effects decarburization thereof, meaning elimination of any carbon that may be contained in it, thus thoroughly purifying the metal.

My primary object may therefore be stated to be that of facilitating and completing the aforesaid Cherry or any analogous ore-purifying process the better to prepare the ore for smelting by freeing from it its injurious impurities.

It may be stated that the class of ore for the treatment of which I more particularly design my improvement is iron ore, though it is advantageously applicable to any kind of ore that is capable of reoxidation—such as gold, silver, copper, lead, and other ores—after having been subjected to deoxidation.

My improved process consists in applying heat through the medium of electricity to the ore in properly-divided form in a peculiar manner to effect breaking up of the chemical union of the impurities with the ore either after or without previously driving off through the medium of superheated air or steam its water of constitution (hydration) and of crystallization and expelling the oxygen, which is combined with the contained acid formations and salts with the metal and metalloids, and also either after or without previously then deoxidizing the ore by the application thereto of superheated hydrogen or other suitable reducing-gas at sufficient heat and pressure to permeate the mass under treament.

As a means for practicing my improved process I provide the apparatus hereinafter described, and illustrated in the accompanying drawings, in which—

Figure 2:
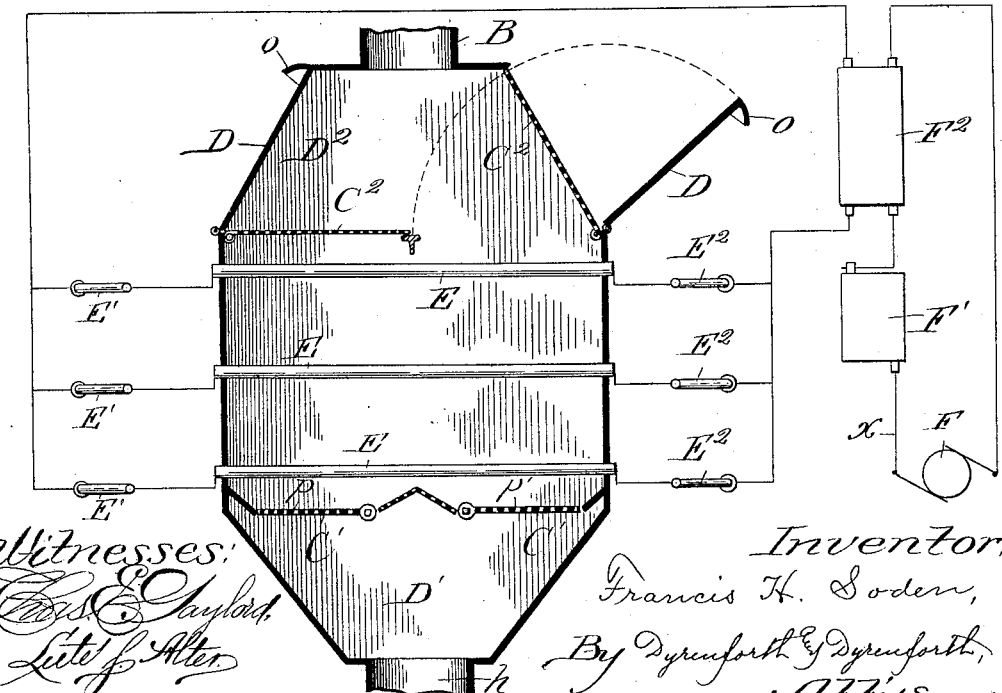

Figure 1 is a perspective view of my improved ore-purifying apparatus; and Fig. 2 is a section taken at the line 2 on Fig. 1, viewed in the direction of the arrow and showing diagrammatically the arrangement of the means for supplying the electricity.

A is an air-tight receptacle of any suitable form, but preferably of the polygonal shape in cross-section illustrated, and adapted to contain ore reduced to small fragments, say the size of hazel nuts, which is about the smallest size necessary for the treatment, though the ore may be pulverized. The material of which the receptacle A is constructed should be highly refractory to withstand a high degree of heat, and to that end I prefer to form it of fire-brick, though plumbago crucible material may be employed for the purpose. I feed the ore into the receptacle A through a pipe B, equipped with a valve device $r$ in a gas-escape pipe $r'$, adapted to be regulated for the escape, at any desired pressure in the receptacle, of the gases in the latter. If it be desired to employ a condensing-chamber (not shown) for the gaseous matter thus escaping, the same may be connected with the outlet end of the escape-pipe $r'$.

C is a pipe containing a shut-off valve $q$ and provided with a branch $C^3$, having a shut-off valve $q'$ and leading into the base of the receptacle below a horizontal screen-diaphragm $C'$ therein, divided along opposite sides of its center, where it is bridged by a cone-shaped head, into two hinged sections $p$ and $p'$, each having connected with it for dumping a hand-wheel $p^2$ at the front end of the receptacle. The upper sides of the receptacle A are formed as hinged doors D, each provided with a handle $o$, by which to manipulate it, and each having connected with it one hinged half of a sectional screen $C^2$, the sections of which extend horizontally and form a screen-diaphragm across the upper portion of the receptacle when the doors are closed, but opening of which latter raises the screen-sections from obstructing the fall of ore from the pipe B into the receptacle upon the bottom diaphragm $C'$. The spaces in the receptacle A, respectively below and above the perforated diaphragms $C'$ and $C^2$, afford gas-chambers $D'$ and $D^2$.

E E are rods, of which three series are shown, one above the other, the members of each series extending, at equal distances apart, transversely across the interior of the receptacle A between the diaphragm and being supported at their opposite ends in the side walls, from which they should be suitably insulated unless the material of the walls be fire-brick or other insulating material. These rods are composed of material highly conductive of electricity, such as high-grade metal (say platinum) or carbon, as they have to withstand intense heat.

F is an electric-current generator, preferably in the form of a dynamo of the alternating-current variety, having its poles connected in multiple, as shown, at projecting ends of all the rods E through the medium of switches $E'$ and $E^2$. This particular connection may be varied without departure from my invention, as by arranging some of the rods E in series with each other, but it is preferred to employ the arrangement illustrated in order to permit currents of low potential to be used, since thereby the ore may be reduced to a higher degree of purification, and consequently to a higher metallic condition, without danger of shunting too much current through it before all the ore in the receptacle A shall have been heated to the required state.

For the purpose of regulating the heating of the conducting-rods E by the current I interpose in the line $x$, leading from one pole of the generator, a suitable rheostat or reactive coil $F'$ (depending upon the kind of generator used) for enabling prompt regulation to a nicety of a degree of heat imparted to the rods, and consequently that imparted to the ore, and where the alternating-current dynamo is employed I also interpose in its circuit a transformer $F^2$.

To practice my purifying process in all its details in the receptacle A, I proceed as follows: The ore is introduced without the admixture of any foreign substance which would tend to promote combustion or the electro-conductivity of the mass through the pipe B on removing its air-tight cover $n$ and opening the doors D to raise the sections of the perforated diaphragm $C^2$. On then fastening the cover in place and closing the doors to render the receptacle air-tight the valve $q$ is opened to admit from a suitable source (not shown) superheated air or superheated steam under pressure into the chamber $D'$, and the dynamo being in operation the switches $E'$ and $E^2$ are adjusted to close the circuits they control and subject the rods to the current, which quickly heats them, their heat being transmitted to the ore in which they are embedded till it attains a red heat at a temperature of from about 1200° to about 1500° Fahrenheit. The ore is maintained in this condition to the exclusion of atmospheric air until the water of crystallization and of its constitution, the inorganic oxygen thereof, and all its fugitive constituents are vaporized and expelled through the safety-valve $r$. The direction of the electric currents is on the wires $x$ $x'$ to the switches, thence to one end of the rods E, and from the opposite ends of the latter back to the generator.

During the heating of the ore as described all the switches should be closed to pass all the current, except such portion thereof as shunts itself through the ore, from one side of the apparatus on the rods E to the opposite side thereof. Thereupon the superheated air or steam supply is shut off at the valve $q$ and hydrogen gas from a suitable source (not shown) is turned on under pressure through the branch pipe $C^3$ to further remove and expel the impurities of the ore while still under subjection to the electric heat from the rods E, the electricity permeating the ore as fast as the impurities are expelled therefrom and acting as a reheating agent to the ore, and this action, by following automatically the release of impurities so closely at the very instant of such release, burns out any carbon there may be in the ore. This is proven by the fact that iron ore of low grade treated in this manner is rendered highly metallic and also by the fact that when the current is cut off, as hereinafter described, from flowing directly through the series of conducting-rods E it will flow from one set of the rods to the other through the ore. This is done to ascertain whether all the impurities have been expelled by the hydrogen and all the ore has been highly charged by electricity by arranging the switches to pass the electric current from the central row of the rods E to the top and bottom rows by closing the switches at the points numbered 2 4 6 in Fig. 1 and opening them at the points 1 3 5. The ore thus treated to a finish is in condition to be reduced readily to metal. This may be accomplished by treating the ore in any suitable manner in an ordinary smelting-furnace.

What I claim as new, and desire to secure by Letters Patent, is—

1. The method of electrically treating ore to purify it preparatory to smelting, which consists in subjecting it under confinement against the access of atmospheric air to the action of superheated air and subjecting it to the action of a purifying-gas, such as hydrogen, and during the periods of such subjection, heating the said ore by subjecting it conductively to the action of an electric current, substantially as described.

2. The method of electrically treating ore to purify it preparatory to smelting, which consists in confining the ore and embedding therein unbroken resistance-conductors in an electric circuit to heat the ore by contact with the electrically-heated conductors and by the resistance the ore presents to the current shunted through it, and introducing into said ore while under such electric subjection, superheated air and a purifying-gas, such as hydrogen, substantially as described.

3. In an apparatus for treating ore, a receptacle A provided with doors D having connected with them hinged sections of a perforated diaphragm $C^2$ normally forming in the receptacle an upper gas-chamber $D^2$, a sectional screen-diaphragm $C'$ in the lower part of the receptacle forming therein a gas-chamber $D'$, a discharge-outlet $h$ from the lower gas-chamber, a covered inlet-pipe B leading into the upper gas-chamber, a pressure-valve for the escape of the gases from the receptacle, valve-controlled pipes C and $C'$ leading into the lower gas-chamber, series of electric conducting-rods E extending across the receptacle to be embedded in the ore, and an electric-current generator having the rods interposed in its circuit, substantially as described.

FRANCIS H. SODEN.

In presence of—
M. J. FROST,
ARTHUR DYRENFORTH.